(12) United States Patent
Oleksyuk et al.

(10) Patent No.: US 10,703,613 B2
(45) Date of Patent: Jul. 7, 2020

(54) FRAME SUPPORT

(71) Applicant: Schwing GmbH, Herne (DE)

(72) Inventors: Mykola Oleksyuk, Hattingen (DE);
Heinrich Scheffer, Haltern am See (DE)

(73) Assignee: SCHWING GMBH, Herne (DE)

( * ) Notice: Subject to any disclaimer, the term of this patent is extended or adjusted under 35 U.S.C. 154(b) by 166 days.

(21) Appl. No.: 15/308,150

(22) PCT Filed: Apr. 29, 2015

(86) PCT No.: PCT/EP2015/059315
§ 371 (c)(1),
(2) Date: Nov. 1, 2016

(87) PCT Pub. No.: WO2015/165950
PCT Pub. Date: Nov. 5, 2015

(65) Prior Publication Data
US 2017/0050825 A1 Feb. 23, 2017

(30) Foreign Application Priority Data

May 2, 2014 (DE) ........................ 10 2014 006 273

(51) Int. Cl.
*B66C 23/78* (2006.01)
*B01F 13/00* (2006.01)
*B01F 15/00* (2006.01)
*B60S 9/02* (2006.01)
*E04G 21/04* (2006.01)

(52) U.S. Cl.
CPC .......... *B66C 23/78* (2013.01); *B01F 13/0037* (2013.01); *B01F 15/00772* (2013.01); *B60S 9/02* (2013.01); *E04G 21/0436* (2013.01); *E04G 21/0445* (2013.01); *B01F 2215/0047* (2013.01)

(58) Field of Classification Search
CPC ....... B66C 23/78; B60S 9/02; E04G 21/0436; E04G 21/0445; B01F 13/0037; B01F 15/00772
USPC ........................................................... 366/26
See application file for complete search history.

(56) References Cited

U.S. PATENT DOCUMENTS

| RE24,482 E | 6/1958 | Felkner | |
| 3,831,774 A * | 8/1974 | Moore | E02F 9/085 |
| | | | 248/357 |

(Continued)

FOREIGN PATENT DOCUMENTS

| CN | 1111197 A | 11/1995 |
| EP | 0661196 A1 | 7/1995 |

(Continued)

OTHER PUBLICATIONS

International Search Report issued in International Application No. PCT/EP2015/059315, dated Aug. 11, 2015, 3 pages.

*Primary Examiner* — Marc C Howell
(74) *Attorney, Agent, or Firm* — Faegre Drinker Biddle & Reath LLP (57) ABSTRACT

A frame support includes an extensible carrier having a free end, a guide configured to guide the extensible carrier in an axially-movable manner, and a vertical support unit. The vertical support unit is arranged eccentrically at the free end of the extensible carrier. The frame support is adapted to be coupled to a vehicle.

20 Claims, 4 Drawing Sheets

(56) References Cited

U.S. PATENT DOCUMENTS

| | | | | |
|---|---|---|---|---|
| 4,200,162 A | * | 4/1980 | Tax | B66C 9/14 180/23 |
| 5,480,275 A | * | 1/1996 | Talbert | B66F 9/07559 187/226 |
| 5,638,967 A | * | 6/1997 | Heckmann | B60S 9/02 212/302 |
| 6,308,985 B1 | * | 10/2001 | Wolfram | B60S 9/12 212/302 |
| 6,773,033 B1 | * | 8/2004 | Fugel | B66C 23/78 280/763.1 |
| 6,799,778 B2 | * | 10/2004 | Heckmann | B60S 9/12 280/763.1 |
| 6,840,540 B2 | * | 1/2005 | Fugel | B66C 23/80 280/763.1 |
| 2002/0109344 A1 | * | 8/2002 | Heckmann | B60S 9/12 280/763.1 |

FOREIGN PATENT DOCUMENTS

| | | |
|---|---|---|
| EP | 0899173 A1 | 3/1999 |
| JP | 5442758 A | 4/1979 |
| JP | 55160956 U | 11/1980 |
| JP | 10100871 A | 4/1998 |
| WO | 2013113225 A1 | 8/2013 |

\* cited by examiner

FRAME SUPPORT

TECHNICAL FIELD

The invention relates to a frame support for a vehicle and also to the use of the frame support in a truck-mounted concrete pump and to a vehicle having a frame support.

BACKGROUND

Support systems for vehicles are known from the prior art. In particular vehicles with a pivotable boom built thereon, for example a distributor boom of a truck-mounted concrete pump, have such support systems. The booms reach considerable heights and cause a tilting moment that depends on the pivoted position and length of the boom. The support transfers the tilting moment to the standing surface of the vehicle and as a result prevents the vehicle with the boom from toppling over.

The requirements placed on the boom length and the range are continually increasing, with the result that ever greater support widths are also necessary. However, since the dimensions of the vehicle profile must not readily exceed particular limits on account of legal regulations, special consideration needs to be given to meeting the greater support widths without in the process exceeding permissible vehicle widths. Truck-mounted concrete pumps are known from the prior art, which have telescopic guides that intersect behind the turntable. However, a disadvantage with such an arrangement is that the guides require a large amount of space and so the pump battery has to be shortened. As a result, the number of switching processes of the concrete switching valve has to be increased, with the result that the pump battery as a whole operates less smoothly and more inefficiently. In addition, boom vibration increases.

In order to be able to allow smoother and more efficient operation of the pump battery, EP 0 661 196 A1 discloses a frame support which has arcuate guides, secured to the vehicle, for extensible carriers that are retractable into the vehicle profile, wherein the guides extend substantially between the vehicle profile longitudinal sides. The center of the vehicle frame remains free, and so sufficient space remains for the pump battery. However, a disadvantage here is that such a support requires a large amount of space for deploying and retracting the extensible carrier. This has the consequence that the center distance between the steerable front axles has to be increased in that the rear front axle is shifted rearward. This results in high costs. Furthermore, as a result of the rear axle being shifted, the nominal number of axles increases, since only axles that are located very close together are considered to be one axle for authorization purposes.

SUMMARY

Therefore, it is an object of the invention to provide a frame support by way of which the vehicle is prevented from tipping over in spite of a considerable boom height, without the concrete delivery being impaired in the process. In addition, it is an object of the invention to provide a frame support which can be integrated into vehicles, in particular trucks, without requiring great effort and conversion measures. Furthermore, the frame support is intended to be readily compatible with applicable standards and regulations.

This object is achieved by a frame support for a vehicle having the features of claim 1 and by a vehicle having the features of claim 10. Advantageous configurations are the subject matter of the respective dependent claims. It should be noted that the features listed individually in the claims can also be combined with one another in any desired and technologically appropriate manner and thus demonstrate further configurations of the invention.

A frame support according to the invention for a vehicle has an extensible carrier, a guide on which the extensible carrier is guided in an axially movable manner, and a vertical support unit. The frame support according to the invention is in this case characterized in that the vertical support unit is arranged eccentrically at the free end of the extensible carrier.

Compared with the prior art, the frame support according to the invention has the advantage that, on account of the asymmetrical arrangement of the vertical support unit on the extensible carrier, less space is required during the deployment and retraction of the supports. In the case of truck chassis with two steerable front axles, the standard spacing between the front steering axles, which is around 170-175 cm, can be maintained. It is no longer necessary to shift the rear front axle. Since the axles are thus located close together, the axles are considered to be one axle for authorization purposes, with the result that vehicles having the frame support according to the invention do not have any problems for authorization. Furthermore, the frame support according to the invention is also compatible with the Euro 6 emission standard. In trucks which have the frame support according to the invention, sufficient space remains to be able to accommodate additional components of the emission control system.

According to the invention, "eccentric" means that the vertically extending longitudinal center axis of the vertical support device does not intersect the longitudinal center axis of the extensible carrier. The longitudinal center axis of the vertical support device extends in a laterally offset manner with respect to the longitudinal center axis of the extensible carrier. Within the meaning of the invention, the longitudinal center axis of the extensible carrier is understood as meaning in particular that line which bisects the contour of the extensible carrier in plane view.

Advantageously, the longitudinal center axis of the vertical support unit is offset inwardly, i.e. toward the vehicle center, with respect to the longitudinal center axis of the extensible carrier at the free end of the latter.

As a result of the eccentric arrangement of the vertical support unit and in particular in combination with the inwardly offset arrangement, it is possible to position the vertical support unit very close to the vehicle exterior in the retracted state of the support. The extensible support therefore no longer has to be retracted so far into the guide in order for all parts of the frame support to be located within the vehicle profile. The retraction and deployment paths and duration can be shortened.

Preferably, the longitudinal center axis of the vertical support unit is offset inwardly by at least 10%, preferably by at least 25% of the width of the extensible carrier with respect to the longitudinal center axis of the extensible carrier at the free end of the latter. This suffices to achieve the underlying object.

The guide and the extensible carrier can be configured in an arcuate manner. As a result of the arcuate configuration, the support can be deployed farther toward the side of the vehicle, such that tilting of the vehicle about one or the other vehicle longitudinal side can be counteracted effectively. The guide is preferably formed in this case such that, on installation in a vehicle, it extends in an arc tangentially to the vehicle longitudinal direction and in this case extends inward from one of the vehicle profile longitudinal sides substantially as far as the vehicle center and onward therefrom as far as the same vehicle profile side. As a result, it is possible to use particularly long extensible carriers, which can be accommodated in the vehicle profile in driving mode. At the same, sufficient space remains for the pump battery.

The guide of the frame support according to the invention can be accommodated in a hollow profile portion. This can be slideways which ensure rotationally fixed guidance for the extensible carrier. In order to ensure better mobility of the extensible carrier in the hollow profile, the guide can also consist entirely or partly of rolling elements. The hollow profile portion can be configured in a rectangular or circular manner. The extensible carrier preferably forms a telescope with the hollow profile portion.

The extensible carrier can be configured in a singly or multiply telescopic manner. Thus, in a completely deployed state, the extensible carrier can have a greater extension than the guide. In the retracted state, the extensible carrier has at most the dimensions of the guide, or of the hollow profile portion. As a result, the support length and width can be increased further.

The vertical support unit can be configured in a telescopic manner. In this case, it preferably comprises an outer telescope, which is arranged on the extensible carrier, and an inner telescope, which can be retracted into the outer telescope and deployed therefrom.

Advantageously, the vertical support unit has a round cross section. As a result of the use of support units with a reduced pipe diameter, the installation situation can be improved further. However, it is also conceivable for the cross section to be angular, preferably square.

The vertical support unit can have an outrigger plate which is preferably arranged at the free end of the inner telescope. The outrigger plate serves to transfer the supporting pressure to the standing surface. Since the vertical support unit according to the invention is located farther out in a retracted state of the support than in the support systems known from the prior art, the outrigger plate should be as small as possible in order that it does not project beyond the vehicle exterior. Preferably, the outrigger plate is round.

Preferably, the vertical support unit has a joint. By way of the joint, it is possible to pivot the outrigger plate laterally when the vertical support unit is raised. As a result, all parts of the support are located within the vehicle width in the retracted state. Particularly preferably, the inner telescope is connected to the outrigger plate via the joint. A ball head can be used for example as the joint.

The vertical support unit can have a rubber sleeve. The rubber sleeve is preferably arranged at the free end of the outer telescope. If the vertical support unit is in the retracted state, the rubber sleeve has a right-angled trapezoidal shape perpendicularly to the vehicle direction. That side of the rubber sleeve that faces the vehicle exterior is in this case formed in a longer manner than the side facing the vehicle center. If the outrigger plate reaches the rubber sleeve on retraction of the inner telescope, it is flapped inward by the rubber sleeve.

The use of the frame support according to the invention for supporting the vehicle frame of a truck-mounted concrete pump is particularly advantageous. When the frame support according to the invention having the arcuate extensible carrier is used, the center of the vehicle frame remains free, and so sufficient room remains for a long pump battery. As a result, the switching operations of the concrete switching valve can be reduced, with the result that the pump battery operates as a whole more smoothly and more efficiently. Boom vibration decreases. The use of the frame support according to the invention in a truck-mounted concrete pump has the advantage overall that the permissible vehicle width does not have to be exceeded. Restrictions for abnormal loads, which are generally imposed in the case of overwidth and/or overlength, can be disregarded.

A further subject of the present invention is a vehicle having at least one frame support according to the invention. The at least one guide of the support extends in this case substantially between the vehicle profile longitudinal sides. If the support is in the retracted state, then all parts of the support are located between the vehicle profile longitudinal sides.

The frame support according to the invention is preferably arranged on the vehicle such that the extensible carrier can be deployed from the vehicle or retracted into the latter between the two movable front axles. As a result of the arrangement according to the invention of the vertical support unit on the extensible carrier, no collision occurs between the vertical support unit and wheels when the extensible carrier is deployed or retracted, even in the case of truck chassis with two steerable front axles which have a standard spacing of about 170-175 cm. It is thus no longer necessary to shift one of the front axles, with the result that problems with authorization are avoided and costs for conversion on the truck are eliminated.

The guide and the extensible carrier are advantageously configured in an arcuate manner. As a result of the arcuate configuration, the support can be deployed farther toward the side of the vehicle, such that tilting of the vehicle about the vehicle axles can be counteracted effectively even in the case of deployed, very long cantilevers. The guide is preferably formed in this case such that, on installation in the vehicle, it extends in an arc tangentially to the vehicle longitudinal direction and in this case extends inward from one of the vehicle profile longitudinal sides substantially as far as the vehicle center and onward therefrom as far as the same vehicle profile side. As a result, it is possible to use particularly long extensible carriers, which can be accommodated in the vehicle profile in driving mode.

Advantageously, the vertical support unit is arranged eccentrically and in an inwardly offset manner at the free end of the extensible carrier. "Inwardly offset" means, according to the invention, that the vertical support unit is arranged on that side of the extensible carrier which is directed toward the vehicle center. The longitudinal center axis of the vertical support unit is thus located between the vehicle center and the longitudinal center axis of the extensible carrier at the free end of the latter when the vehicle is viewed in plan view from above. As a result of this arrangement, it is possible to position the vertical support unit very close to the vehicle exterior in the retracted state of the frame support. Therefore, the extensible carrier does not have to be retracted so far into the guide in order for all parts of the frame support to be located within the vehicle. The retraction and deployment paths and duration can thus be shortened.

Preferably, the longitudinal center axis of the vertical support unit is offset inwardly by at least 10%, preferably by at least 25% of the width of the extensible carrier with respect to the longitudinal center axis of the extensible carrier at the free end of the latter. This suffices to achieve the underlying object. On the other hand, the tilting moments introduced into the extensible carrier by the lateral offset of the vertical support unit are sufficiently small, as long as the lateral offset corresponds to less than 50% of the width of the extensible carrier. The width of the extensible carrier in this case denotes the horizontal extent of the extensible carrier in the direction transversely to its longitudinal center axis.

The invention relates in particular to vehicles having a built-on concrete pump. The vehicle has a boom which serves as a distributor boom and carries a concrete delivery line. By way of the frame support according to the invention, it is possible to ensure that tilting of the vehicle with a very long cantilever, for example with a length of 40 meters or more, can be counteracted.

The invention and the technical context are explained in more detail in the following text by way of the figures.

It should be noted that the figures show a particularly preferred embodiment variant of the invention. The invention is not limited to the embodiment variant shown, however. In particular, the invention comprises any desired combinations of the technical features which are listed in the claims or are described as being relevant to the invention in the description, where technically appropriate.

DETAILED DESCRIPTION

Figure 1:
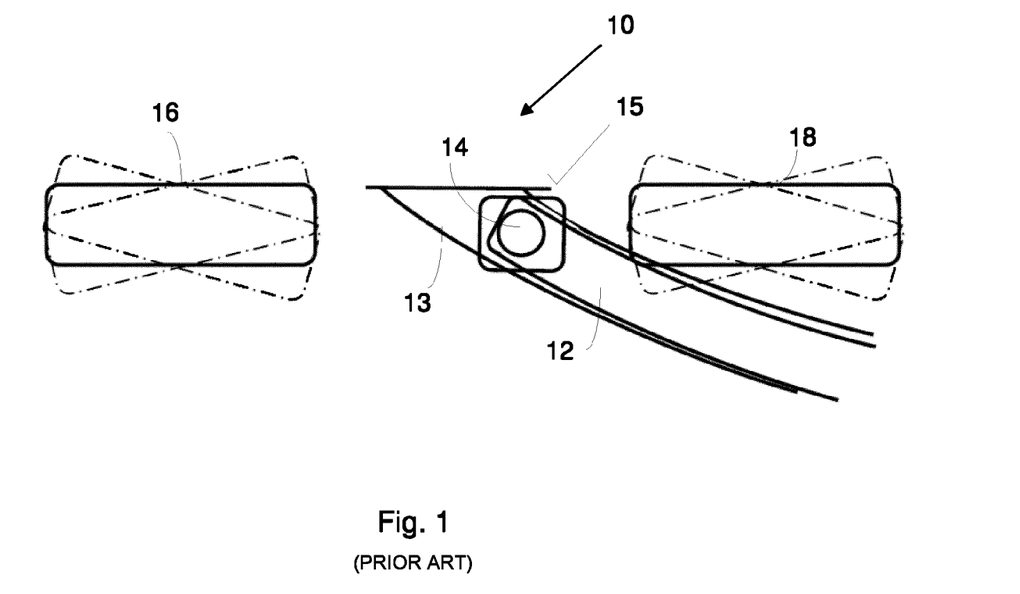
FIG. 1 shows a schematic plan view of a frame support known from the prior art in a retracted state.
Figure 2:
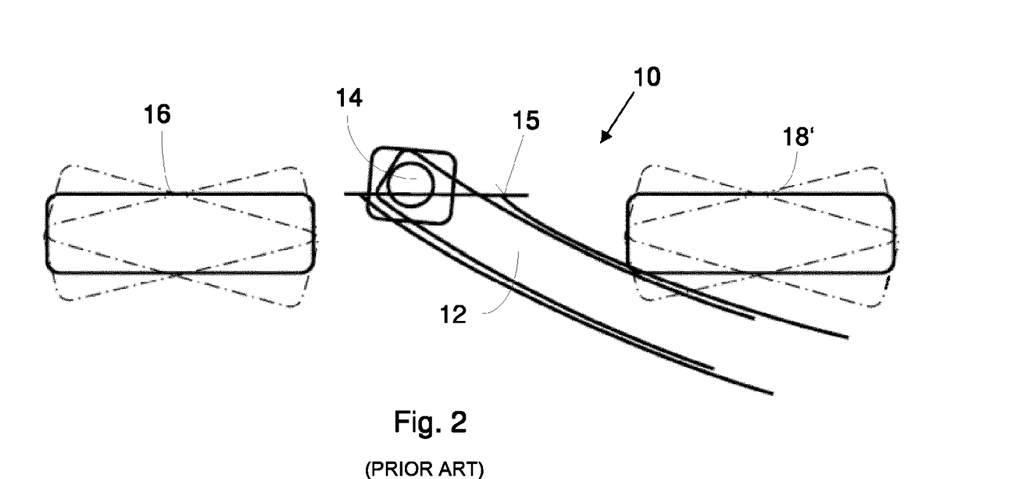
FIG. 2 shows a schematic plan view of a frame support known from the prior art during deployment.

FIGS. 1 and 2 show a schematic plan view of a frame support 10 known from the prior art in a retracted state and during deployment, respectively. The frame support 10 has a guide 13, secured to the vehicle, for an extensible carrier 12 that is retractable into the vehicle profile and deployable therefrom. A vertical support unit 14 is arranged centrally at the free end of the extensible carrier 12. In the retracted state, all parts of the support 10 are arranged within the vehicle width 15.

The frame support 10 is arranged on the vehicle such that the carrier 12 can be deployed from the vehicle and retracted into the latter between the two movable front axles 16, 18. In order that a collision does not occur between the vertical support unit 14 and the wheels during retraction and deployment of the extensible carrier 12, the center distance between the steerable front axles 16, 18 has to be increased. To this end, the rear front axle 18 is shifted rearward. As a result, the nominal number of axles is increased. The shifting of the axles results in high costs.

Figure 3:
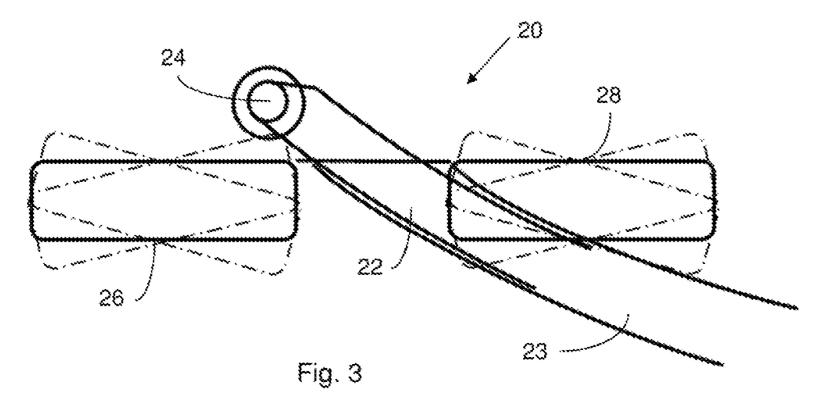
FIG. 3 shows a schematic plan view of a frame support according to the invention during deployment, in a first configuration.
Figure 4:
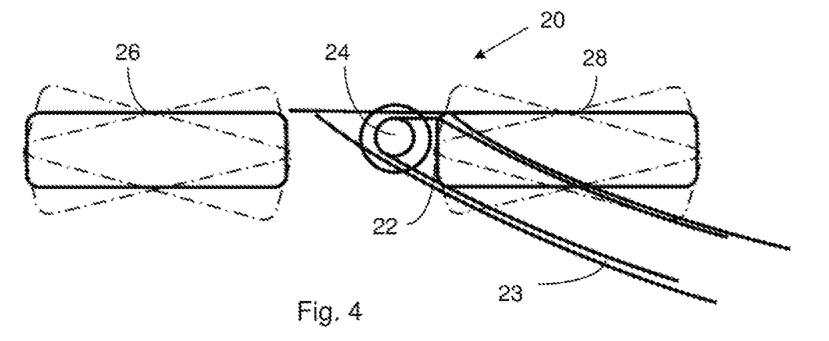
FIG. 4 shows a schematic plan view of a frame support according to the invention in a retracted state.

FIGS. 3 and 4 show a schematic plan view of a frame support 20 according to the invention during deployment and in a retracted state, respectively. The frame support has a guide 23 which is arranged within the vehicle frame. The frame support 20 furthermore has an extensible carrier 22 which is retractable into the vehicle frame and deployable therefrom and is guided by the guide 23. The extensible carrier 22 has an eccentrically arranged vertical support unit 24 at its free end. "Eccentric" means that the vertical longitudinal center axis of the support unit 24 is located in a manner laterally offset from the longitudinal center axis, i.e. from the centerline of the extensible carrier. Preferably, the vertical support unit 24 is arranged on the extensible carrier 22 in an inwardly offset manner, that is to say in the direction of the vehicle center. In the retracted state, all parts of the frame support 20 are arranged within the vehicle width.

The frame support 20 is arranged on the vehicle such that the extensible carrier 22 can be deployed from the vehicle and retracted into the latter between the two movable front axles 26, 28. As a result of the arrangement according to the invention of the vertical support unit 24 on the extensible carrier 22, no collision occurs between the vertical support unit 24 and wheels when the extensible carrier 22 is deployed or retracted, even in the case of truck chassis with two steerable front axles which have a standard spacing between the front steering axles 26, 28 of about 170-175 cm. Problems with authorization can be avoided.

Figure 5:
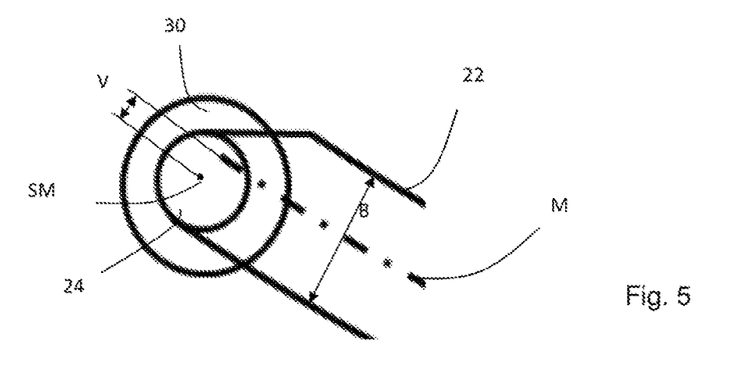
FIG. 5 shows a schematic plan view of a vertical support unit.

FIG. 5 shows a schematic plan view of a vertical support unit 24. According to the invention, the vertical support unit 24 is arranged to the side of the longitudinal center axis M or centerline of the extensible carrier 22 (illustrated by the dot-dash line in the figure), which bisects the contour of the extensible carrier 24 in vertical view. This means that the vertical support unit 24 is arranged asymmetrically or eccentrically on the extensible carrier 22. As a result, in particular, a standard spacing between the front steering axles 26, 28 can be maintained. The previously necessary conversion is eliminated. Considerable costs are saved.

As can be seen in FIG. 5, in the exemplary embodiment, the offset V of the longitudinal center axis SM of the vertical support unit 24 from the centerline M is about 25% of the width B of the extensible carrier 22. The longitudinal center axis SM of the vertical support unit is still located within the horizontal extension of the extensible carrier 22. As a result, the tilting moments that are introduced into the extensible carrier 22 by the offset V are sufficiently limited.

Figure 6:
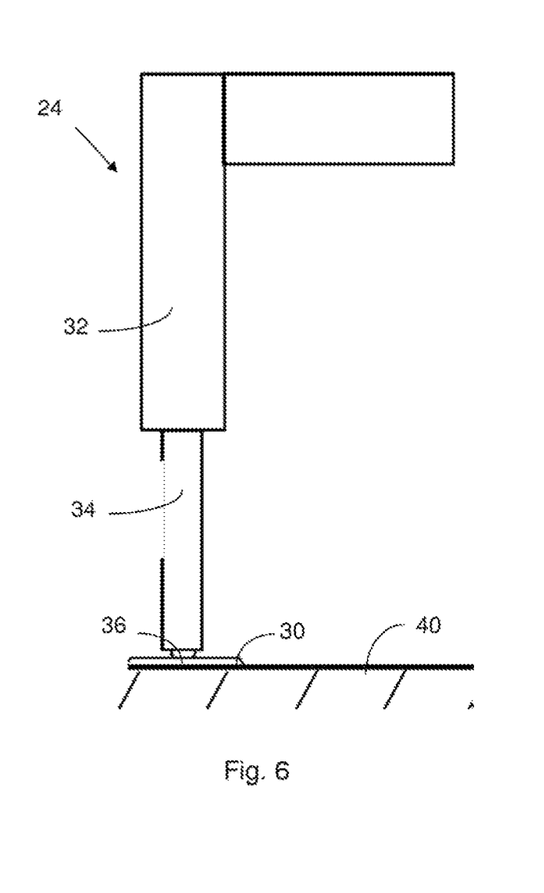
FIG. 6 shows a schematic illustration of a vertical support unit in one possible configuration.

FIG. 6 shows a schematic illustration of a vertical support unit 24 in a configuration in the deployed state. The vertical support unit 24 is configured in a telescopic manner. It has an outer telescope 32 which is arranged on the extensible carrier 22. Furthermore, the vertical support unit 24 has an inner telescope 34 which is retractable into the outer telescope 32 and deployable from the latter.

The vertical support unit 24 preferably has a round cross section.

The vertical support unit 24 has an outrigger plate 30 which is arranged at the free end of the inner telescope and is preferably configured in a round manner. The outrigger plate 30 serves to transmit the supporting pressure to a standing surface 40. Preferably, the inner telescope 34 is connected to the outrigger plate via a joint 36. A ball head can be used for example as the joint 36. By way of the joint 36, it is possible to pivot the outrigger plate 30 laterally when the vertical support unit 24 is raised. As a result, all parts of the support 20 according to the invention are located within the vehicle width 15 in the retracted state of the support 20.

Figure 7:
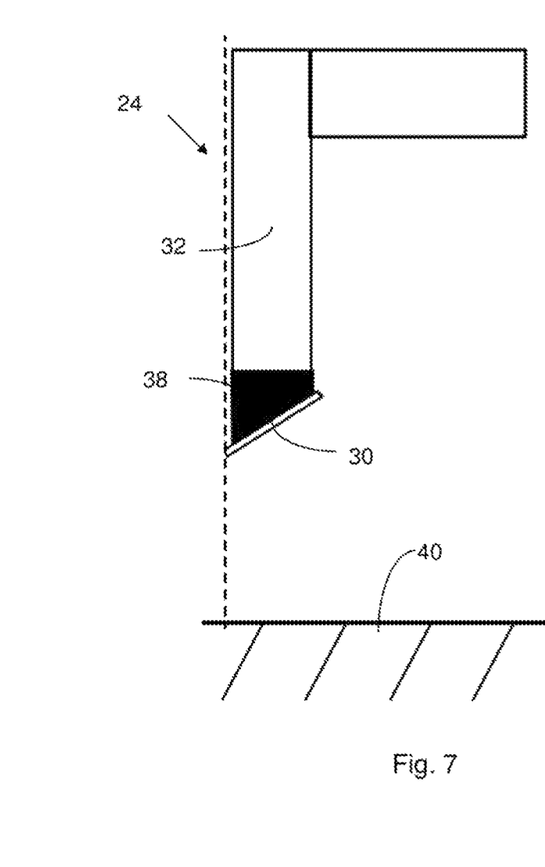
FIG. 7 shows a schematic illustration of a vertical support unit in a further configuration.

FIG. 7 shows a schematic illustration of a vertical support unit 24 in a further configuration in the retracted state. The dashed, vertically extending line represents the vehicle width, or the vehicle exterior.

The support unit 24 is configured in a telescopic manner. It has at least one outer telescope 32 and an inner telescope 34. An outrigger plate 30 is arranged at the free end of the inner telescope 34 via a joint 36. A rubber sleeve 38 is arranged at the free end of the outer telescope 32. If the rubber sleeve 38 is sectioned perpendicularly to the direction of travel, the rubber sleeve 38 has a right-angled trapezoidal shape. The side facing the vehicle exterior 15 is in this case formed in a longer manner than the side facing the vehicle center. If the outrigger plate 30 reaches the rubber sleeve 38 on retraction of the inner telescope 34, it is flapped inward by the rubber sleeve 38. This prevents the outrigger plate 30 from projecting out beyond the vehicle exterior 15. The maximum vehicle width is thus maintained.

Figure 8:
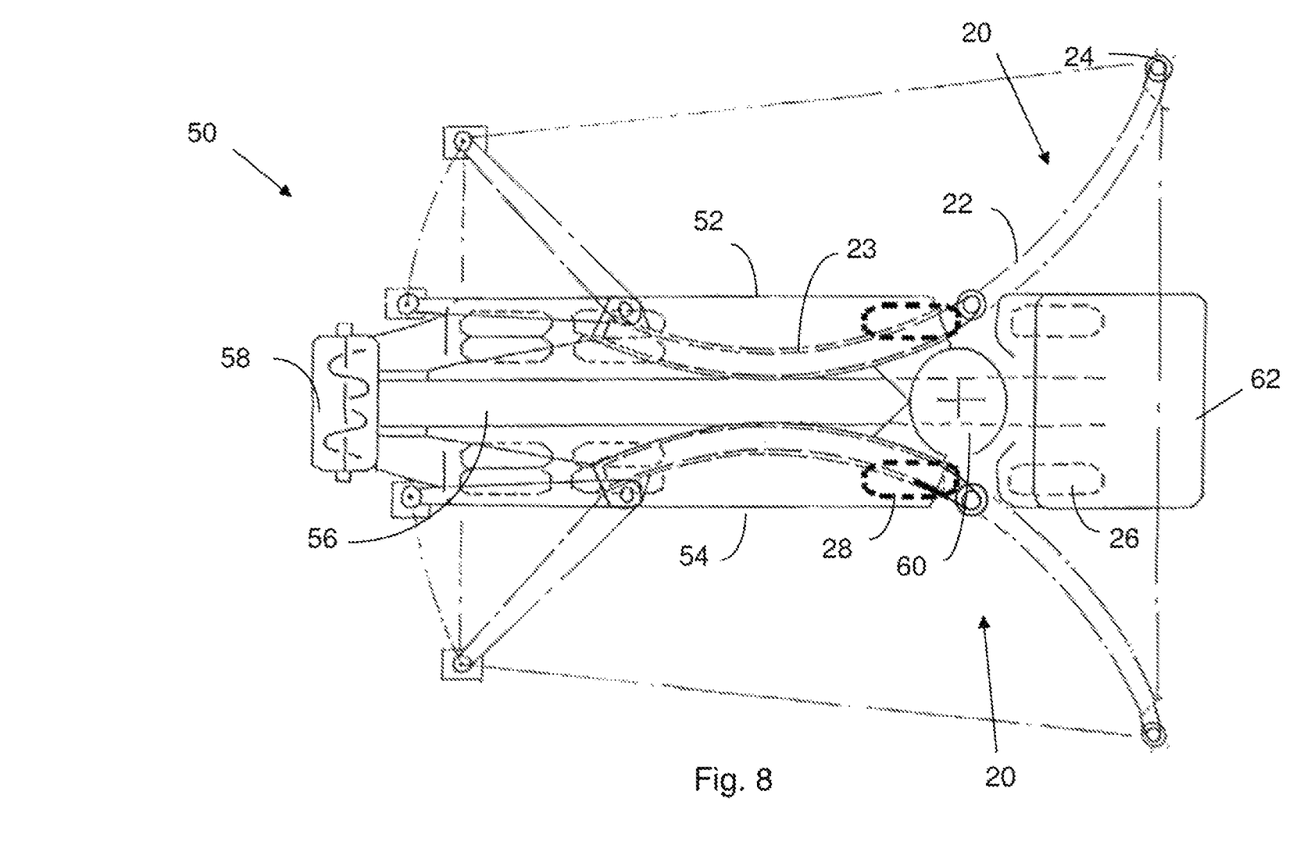
FIG. 8 shows a schematic plan view of a vehicle according to the invention.

FIG. 8 shows a schematic plan view of a vehicle 50 according to the invention. The vehicle 50 has a cab 62. Located behind the cab 62 is a turntable 60 of a concrete distributor boom 56. The vehicle has two steerable front axles 26, 28. Arranged at the rear of the vehicle 50 is a filling hopper 58 via which concrete is poured in. The vehicle 50 has four-point support. The front support has the frame support 20 according to the invention. However, it is also conceivable for both the front and the rear frame support to be configured according to the invention. The frame support according to the invention ensures that tilting of the vehicle 50 can be counteracted even with very long cantilevers 56, for example with a length of 40 meters or more.

The guide 23 of the frame support 20 according to the invention extends substantially between the vehicle profile longitudinal sides 52, 54. If the support 20 is in the retracted state, all parts of the frame support 20 are located between the vehicle profile longitudinal sides 52, 54. The frame support 20 according to the invention is arranged on the vehicle 50 such that the extensible carrier 22 can be deployed from the vehicle 50 or retracted into the latter between the two movable front axles 26, 28. As a result of the arrangement according to the invention of the vertical support unit 24 on the extensible carrier 22, namely eccentrically, no collision occurs between the vertical support unit 24 and the wheels when the extensible carrier 22 is deployed or retracted, even in the case of truck chassis with two steerable front axles 26, 28 which have a standard spacing.

The guide 23 and the extensible carrier 22 are configured in an arcuate manner. In this case, the guide 23 preferably extends in an arc tangentially to the vehicle longitudinal direction and in this case extends inward from one of the vehicle profile longitudinal sides 52, 54 substantially as far as the vehicle center and onward therefrom as far as the same vehicle profile side 52, 54. As a result, it is possible to use particularly long extensible carriers 22, which can be accommodated in the vehicle profile in driving mode. At the same time, sufficient space remains for a long pump battery.

LIST OF REFERENCE SIGNS

10 Frame support (prior art)
12 Extensible carrier (prior art)
13 Guide (prior art)
14 Vertical support unit (prior art)
15 Vehicle exterior/vehicle width
16 Front axle of the steerable front axles (prior art)
18 Rear axle of the steerable front axles (prior art)
20 Frame support
22 Extensible carrier
23 Guide (hollow profile)
24 Vertical support unit
26 Front axle of the steerable front axles
28 Rear axle of the steerable front axles
30 Outrigger plate
32 Outer telescope
34 Inner telescope
36 Joint
38 Rubber sleeve
40 Standing surface
50 Vehicle
52 Vehicle profile longitudinal side
54 Vehicle profile longitudinal side
56 Boom
58 Filling hopper
60 Turntable
62 Cab
M Centerline of extensible carrier
SM Longitudinal center axis of support unit
V Offset
B Width of extensible carrier

The invention claimed is:

1. A frame support for a vehicle, the frame support comprising:
    an extensible carrier having a free end and a width at the free end;
    a guide configured to guide the extensible carrier in an axially-movable manner, the guide and the extensible carrier being arranged in an arcuate manner; and
    a vertical support unit,
    wherein the vertical support unit is arranged eccentrically at the free end of the extensible carrier such that a vertically-extending longitudinal center axis of the vertical support unit is offset from a longitudinal center axis of the free end of the extensible carrier but within the extent of the width of the free end of the extensible carrier,
    wherein the guide is configured to be arranged tangentially to a vehicle's longitudinal direction on only one side of a vehicle's center longitudinal axis and extend along an arc on the only one side of the vehicle's center longitudinal axis inward from a vehicle's profile longitudinal side substantially as far as a vehicle center longitudinal axis and onward therefrom as far as the vehicle's profile longitudinal side.

2. The frame support of claim 1, wherein at least a portion of the extensible carrier is positioned within a hollow portion of the guide.

3. The frame support of claim 2, wherein the extensible carrier is configured to extend out of and retract into the guide.

4. The frame support of claim 1, wherein the vertical support unit is telescopic.

5. The frame support of claim 1, wherein the vertical support unit has a round cross section.

6. The frame support of claim 1, wherein the vertical support unit includes an outrigger plate.

7. The frame support of claim 6, wherein the vertical support unit includes a joint coupled to the outrigger plate.

8. The frame support of claim 7, wherein the joint is a ball-head joint.

9. The frame support of claim 1, wherein the vertical support unit is offset such that a vertically-extending longitudinal center axis of the vertical support unit is offset from a longitudinal center axis of the free end of the extensible carrier by a distance further away from a center of the arc of the guide.

10. The frame support of claim 1, wherein the vertical support unit is arranged eccentrically such that the vertically-extending longitudinal center axis of the vertical support unit is offset from the longitudinal center axis of the free end of the extensible carrier in a direction away from a center of the arc of the guide.

11. The frame support of claim 1, wherein the vertical support unit is arranged eccentrically but within the extent of the width of the free end of the extensible carrier.

12. A vehicle having a longitudinal direction and a vehicle profile with longitudinal sides, the vehicle comprising:
   a first frame support assembly including an extensible carrier having a free end and a width at the free end,
   a guide positioned on only one side of a vehicle's center longitudinal axis and configured to guide the extensible carrier in an axially-movable manner along an arc on the only one side of the vehicle's center longitudinal axis, the guide and the extensible carrier being arranged in an arcuate manner and tangentially to the vehicle's longitudinal direction and extend inward from one of the vehicle profile's longitudinal sides substantially as far as a vehicle center and onward therefrom as far as the same vehicle profile longitudinal side, and
   a vertical support unit, wherein the vertical support unit is arranged eccentrically at the free end of the extensible carrier such that a vertically-extending longitudinal center axis of the vertical support unit is offset from a longitudinal center axis of the free end of the extensible carrier but within the extent of the width of the free end of the extensible carrier.

13. The vehicle of claim 12, wherein the vertical support unit is offset inwardly towards the vehicle.

14. The vehicle of claim 12, wherein the longitudinal center axis of the vertical support unit is offset inwardly by at least ten percent of a width of the extensible carrier.

15. The vehicle of claim 12, wherein the longitudinal center axis of the vertical support unit is offset inwardly by at least twenty-five percent of a width of the extensible carrier.

16. The vehicle of claim 12, wherein the first frame support assembly extends between longitudinal sides of the vehicle.

17. The vehicle of claim 12, wherein the extensible carrier is configured to extend out of and retract into the guide.

18. The vehicle of claim 12, further comprising:
   a concrete pump; and
   a distributor boom.

19. The vehicle of claim 12, further comprising:
   a second frame support assembly including
      a second extensible carrier having a free end,
      a second guide configured to guide the second extensible carrier in an axially-movable manner, the second guide and the second extensible carrier being arranged in an arcuate manner on only an opposite side of the vehicle's center longitudinal axis, and
      a second vertical support unit, wherein the second vertical support unit is arranged eccentrically at the free end of the second extensible carrier such that a vertically-extending longitudinal center axis of the second vertical support unit is offset from a longitudinal center axis of the free end of the second extensible carrier.

20. The vehicle of claim 12, wherein the vertical support unit is arranged eccentrically such that the vertically-extending longitudinal center axis of the vertical support unit is offset from the longitudinal center axis of the free end of the extensible carrier in a direction away from a center of the arc of the guide.

* * * * *